May 17, 1966 W. A. BEACH ETAL 3,251,393
FLAME GROWTH CONTROL DEVICE FOR OIL BURNERS
Original Filed Aug. 30, 1961 7 Sheets-Sheet 1

William A. Beach  Edward K. Matthews
Donald Borden   Charles W. Siegmund  Inventors By Richard L. Caunaday
Patent Attorney May 17, 1966   W. A. BEACH ETAL   3,251,393
FLAME GROWTH CONTROL DEVICE FOR OIL BURNERS
Original Filed Aug. 30, 1961   7 Sheets-Sheet 5

William A. Beach   Edward K. Matthews
Donald Borden   Charles W. Siegmund   Inventors By *Richard L. Connaday*
Patent Attorney May 17, 1966   W. A. BEACH ET AL   3,251,393
FLAME GROWTH CONTROL DEVICE FOR OIL BURNERS
Original Filed Aug. 30, 1961   7 Sheets-Sheet 6

William A. Beach
Donald Borden
Edward K. Matthews
Charles W. Siegmund   Inventors By *Richard L. Cannaday*
Patent Attorney William A. Beach
Donald Borden
Edward K. Matthews
Charles W. Siegmund
Inventors By Richard L. Cennaday
Patent Attorney

3,251,393
FLAME GROWTH CONTROL DEVICE FOR OIL BURNERS

William A. Beach, Milltown, Donald Borden, Franklin Park, Edward K. Matthews, Westfield, and Charles W. Siegmund, Morris Plains, N.J., assignors to Esso Research and Engineering Company, a corporation of Delaware
Continuation of application Ser. No. 134,890, Aug. 30, 1961. This application Dec. 2, 1964, Ser. No. 416,964
15 Claims. (Cl. 158—4)

This application is a continuation of applicants' prior copending application Serial No. 134,890 filed August 30, 1961, and now abandoned which case was in turn a continuation-in-part of copending application Serial No. 45,990 filed in the United States Patent Office on July 28, 1960, and now abandoned by one of the applicants.

This invention relates to oil burning devices. It relates particularly to oil burning devices for heating purposes. It relates more particularly to oil burning devices for heating purposes having a furnace region in which oil is consumed. It relates still more particularly to a means for improving distribution of the flame in such devices, and it relates even still more particularly to a novel means and method whereby smoke-free combustion at low rates of excess air is promoted, and furnace efficiency increased accordingly.

The majority of furnace-type combustion devices in heating systems using oil as a fuel for both home and industrial service are of the gun variety. A combustion device of this variety comprises an oil spray nozzle surrounded by an air barrel or blast tube fitted internally with vanes whereby swirl is intended to be imparted to the air of combustion for turbulent mixing thereof with oil leaving the nozzle. Combustion devices of the gun variety may be classified further as low pressure or high pressure with reference to the pressure of the oil supply.

In low pressure units for home heating, for example, oil is supplied to the spray nozzle at pressures in the range of 2 to 15 pounds per square inch. A small amount of air, perhaps 1 to 5 percent of that needed theoretically to burn the fuel, is mixed with oil ahead of or within the nozzle. The principal function of this air is to help break up the oil stream into fine droplets upon leaving the nozzle, the oil being thereafter mixed with air from the blast tube to achieve a combustible mixture. The air supplied by the blast tube will be at a pressure only slightly above atmospheric. In high pressure units oil is supplied to the spray nozzle at a pressure of about 100 pounds per square inch, and is not mixed with any air ahead of the nozzle. As in the low pressure unit, the blast tube supplies air for combustion at only a very slight positive pressure. In both the low and the high pressure units for home heating, oil rates do not often exceed 1.70 gallons per hour.

To obtain truly smoke-free combustion in furnace-type heating systems using oil as a fuel, it has generally been necessary to supply the oil burner unit with air at a rate considerably in excess of that needed theoretically to consume the fuel completely for a given rate of fuel supply. The greater the excess of air, the lower will be the efficiency of the furnace. In order to achieve a reasonable furnace efficiency, most oil burners are actually operated on a compromise basis with excess air rates kept low enough that there is no extreme depression of combustion chamber temperature, but with the attendant generation of at least some smoke. Because smoke-forming conditions do exist, there will be internal sooting of the furnace which will gradually impair over-all furnace efficiency in any case because of soot deposits on heat transfer surfaces.

Taking the foregoing as operative facts, a research program has been carried out to determine just why it is that oil burners do form smoke. This program has revealed certain faults of design and usage common to gun variety oil burners generally.

In the course of this program it was discovered that the air stream from most oil burners assumes the form of a free jet. This is a moving funnel of air having a rather small included angle, usually only about 18°. The net motion of all air within this jet is essentially axial despite the vanes or other turbulating devices placed within the blast tube to impart particular special motions to the air. As a consequence of air discharge from the blast tube in free jet form, two significant conditions were determined to exist very often which will cause smoky operation of typical gun variety oil burners unless a large excess of air be supplied to the combustion zone.

The first of these conditions is that the central portion of the air stream from the blast tube moves much too fast to allow combustion to be sustained in or be spread across it, even assuming an ideally homogenized mixture of air and oil vapor for combustion purposes. The velocity of the central portion of the combustion air often exceeds 20 ft./sec., and only near the stream boundaries do velocities come down as low as about 8 ft./sec., the practical maximum speed for a steady flame for the system considered. In effect, the fast moving core of the main combustion air emanating from the blast tube of a typical oil burner unit literally blows out the flame across most of the air stream, which of course includes at least the greater part of the oil emitted from the spray nozzle, to leave only a sleeve of flame surrounding this core, rather than the whole stream turning into a complete cylinder of flame with a flame front extending transversely of the air stream axis. This is determinable not only by visual inspection of the flame through a window in the back wall of a combustion chamber but also from the fact that temperatures measured in the center of the air stream or jet of a burner that is firing are below the boiling point of home heating oil, sometimes and in some places being as low as 240° F. while those near the air stream boundaries but at the same axial distance out from the spray nozzle tip are as high as 2200° F.

The second condition existing very often with typical oil burners as a consequence of air emanation therefrom in free jet form is that of their spray nozzles discharging at least some liquid fuel through the boundaries of the air stream; that is, the air flow and oil spray patterns are mismatched so that a portion of the oil supplied is not permanently mixed with the combustion air within the main air stream.

As a result of these conditions, a substantial portion of the fuel is forced to burn outside of the main air stream, particularly in furnaces of home heating size where combustion chamber lengths may be rather limited. In such furnaces, and indeed sometimes in furnaces of industrial heating size, unburned core material of the main air and oil mixture stream will impinge upon the back wall of the combustion chamber and be spread outwardly in many directions. While flowing as part of the main stream from the burner this unburned core material will have been in a highly turbulent state, but upon being spread outwardly off of the combustion chamber back wall it will lose turbulence rapidly. Such loss of turbulence will make burning of the fuel in the mixture more difficult even though it be now heated to the point of being fully vaporized. Accordingly, in order to burn this fuel completely at last, the fuel going down unburned in the main air stream prior to impingement on the back wall, this stream must contain a considerable excess of air because it will be required to support combustion in a region of reduced turbulence where diffusion rates of both hydrocarbon vapors and oxygen will be low.

The situation with respect to oil fuel sprayed through the boundaries of the main air stream will be even less favorable. Breaking through the air stream, this fuel will emerge into a combustion chamber front region near the spray nozzle which will be adequately hot to vaporize the fuel, but one which will also be, or at least tend to be, starved of oxygen and low in turbulence. For its oxygen this front region must relay on back swirl and back diffusion of air from the rear region of the combustion chamber wherein the core material of the main air stream is finally being burned, and this latter region will tend to be none too generously supplied with air for its own needs in any case.

Another consideration is that although a substantial quantity of the air going down the core of the main stream from the oil burner unit is in excess of that needed theoretically to burn the fuel in this core, not all of this excess will be available in fact to burn the fuel which is sprayed out through the stream boundaries in the front region of the combustion chamber. A good deal of this excess air will be swept up through the furnace and out the flue or stack along with the products of combustion without having had any opportunity to back swirl or back diffuse toward the combustion chamber front region. Accordingly, in order to get sufficient air into this region for complete and relatively only slightly turbulent combustion of any fuel sprayed thereinto, remembering that such combustion will itself call for a considerable excess of air over that needed theoretically to burn this fuel, quite a large percentage of excess air over-all must be supplied to the combustion chamber through the blast tube of the oil burner unit. Unless this be done, at least part of the fuel supplied to the combustion chamber will not be completely burned but will instead be polymerized to smoke. On the other hand, if sufficient excess air be supplied to prevent such polymerization, that is, to give truly smokeless combustion, there will be a substantial reduction in furnace efficiency.

According to the aforementioned research program and particularly according to this invention, it has been found that the effects of both of the described conditions which lead to smoky combustion can be alleviated to a very great extent and also quite inexpensively by providing a flame growth control device of appropriate design in the air stream. Such a device, as used according to this invention, is one which provides regions of high turbulence but low net forward velocity within the air stream whereat and wherein combustion may be initiated, with these regions subsequently constituting continuously burning ignition points for fuel all across the air stream.

Accordingly, it is a principle object of this invention to provide a novel means and method of raising the efficiency of an oil burner by reducing the amount of excess air required to be supplied thereto to obtain substantially complete smoke-free combustion.

The nature and substance of this invention will be more clearly perceived and fully understood by referring to the following description and claims taken in connection with the accompanying drawings in which:

Figure 1:
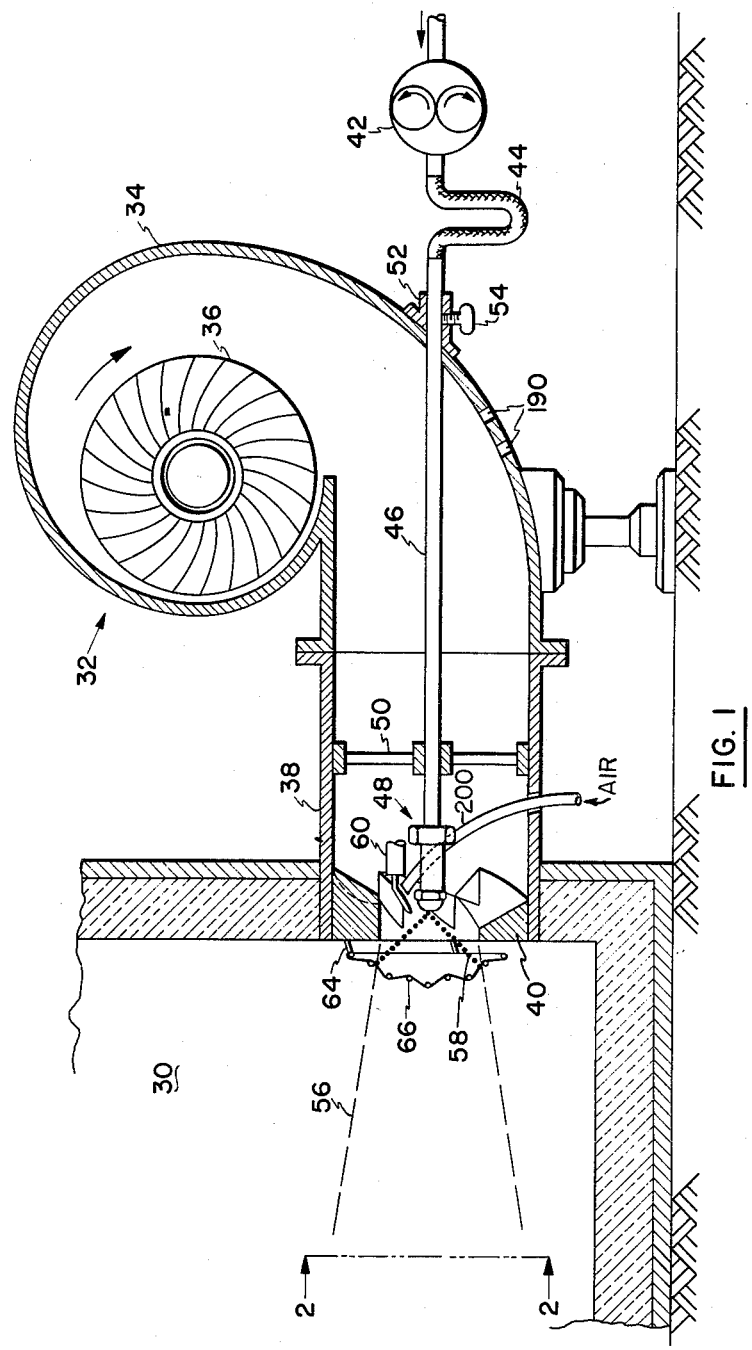
FIG. 1 represents a view in sectional elevation through a heating furnace showing part of the combustion chamber and a gun variety, high pressure oil burner unit provided with a flame growth control device comprising a grid structure of spherical contour, this device being attached to the air orifice of the burner blast tube.
Figure 5:
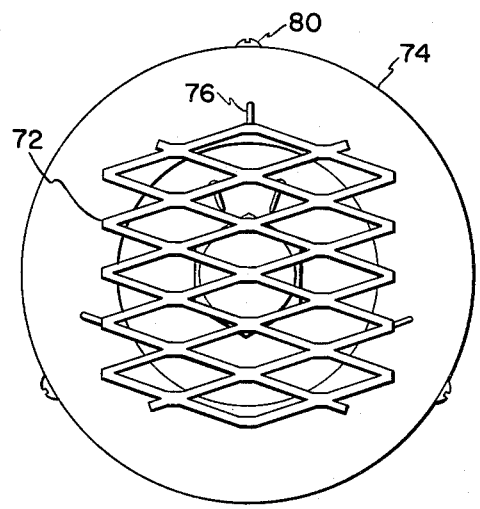
Figure 9:
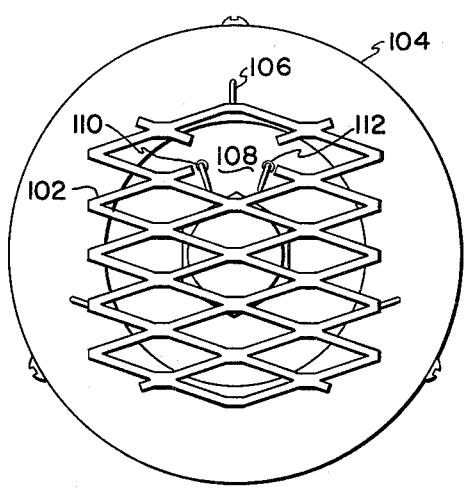
Figure 10:
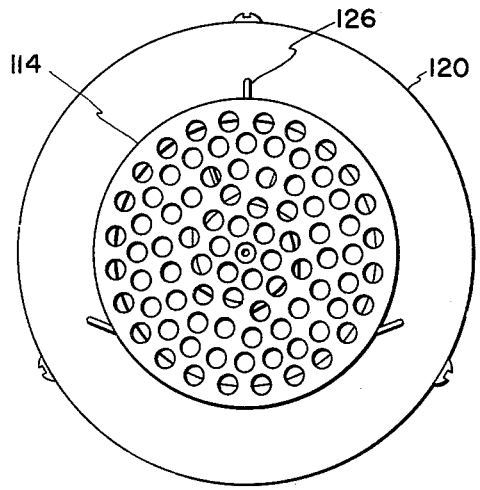
Figure 11:
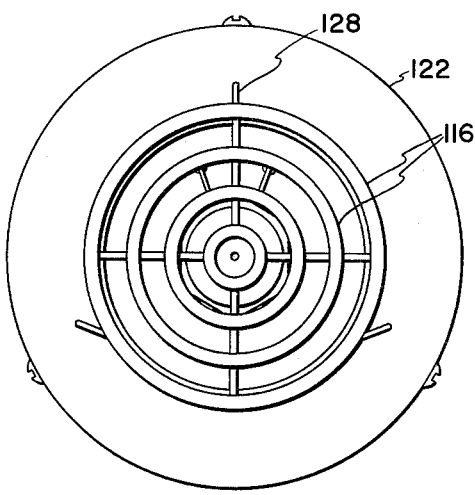
Figure 12:
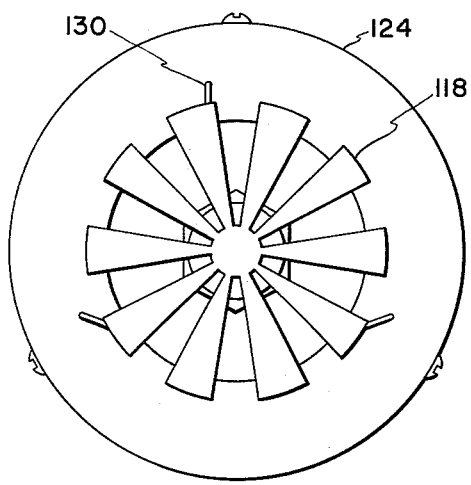
Figure 13:
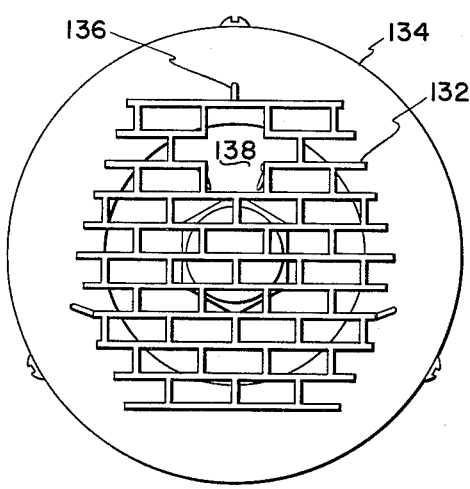
Figure 14:
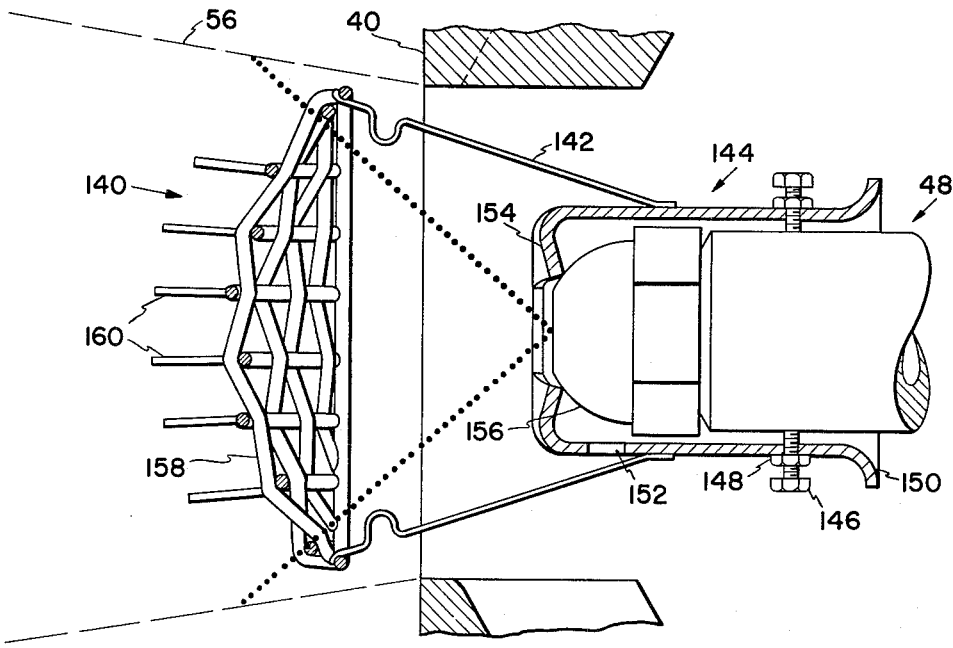
Figure 15:
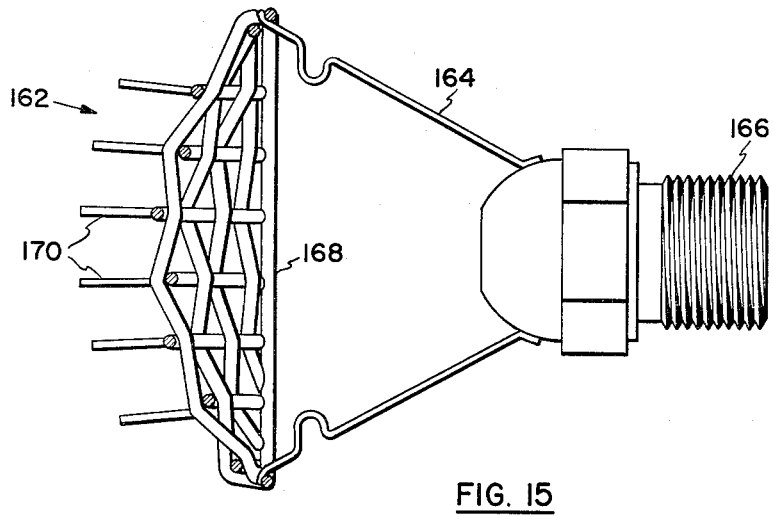
Figure 16:
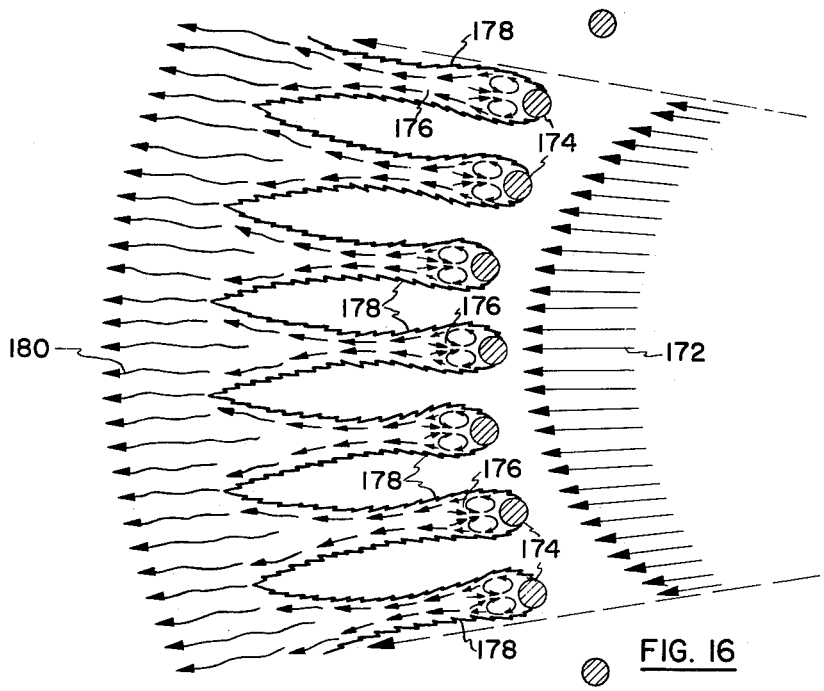

FIG. 9 represents a frontal elevation view of a flame growth control device similar to that shown in FIG. 5, this device being characterized by a cut out region generally at a radius from its normal axial line corresponding to the radial distance out from the axis of the burner blast tube whereon the flame growth control device and its end cone are mounted on the igniting electrodes within the tube;

FIG. 10 represents a frontal elevation view of a flame growth control device in the form of a perforated plate;

FIG. 11 represents a frontal elevation view of a flame growth control device in the form of a series of concentric rings;

FIG. 12 represents a frontal elevation view of a flame growth control device in the form of a spoked hub, star, or multi-bladed fan;

FIG. 13 represents a frontal elevation view of a flame growth control device in the form of mortar-work or a rectangular grid with one group of parallel elements of a discontinuous nature, this device being characterized by a cut out region generally similar to that of the device of FIG. 9;

FIG. 14 represents a view partly in section of the region within the oil burner unit of FIG. 1 adjacent the outlet end of the blast tube showing particularly the outlet end of the oil spray nozzle apparatus with a heat shield mounted on this apparatus and a flame growth control device of spherical contour attached to this shield;

FIG. 15 represents a side elevation view, partly in section, of a flame growth control device of spherical contour attached to the tip element of an oil spray nozzle apparatus;

FIG. 16 represents a view in sectional elevation through a flame growth control device grid structure of spherical contour showing the flow of a combustible mixture to this structure and the flow of flaming products of combustion away therefrom, and in particular showing the regions of high turbulence but low net forward velocity downstream from the grid elements.

Figure 17:
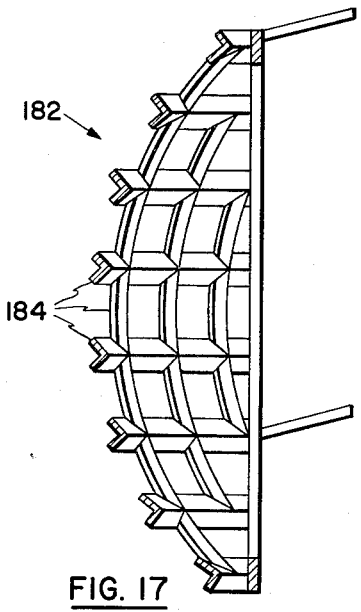
Figure 18:
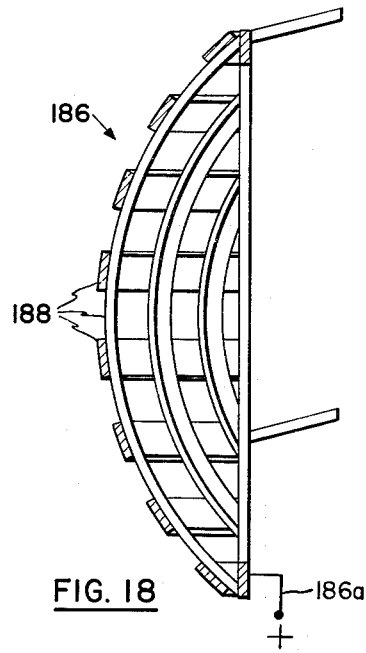
Figure 19:
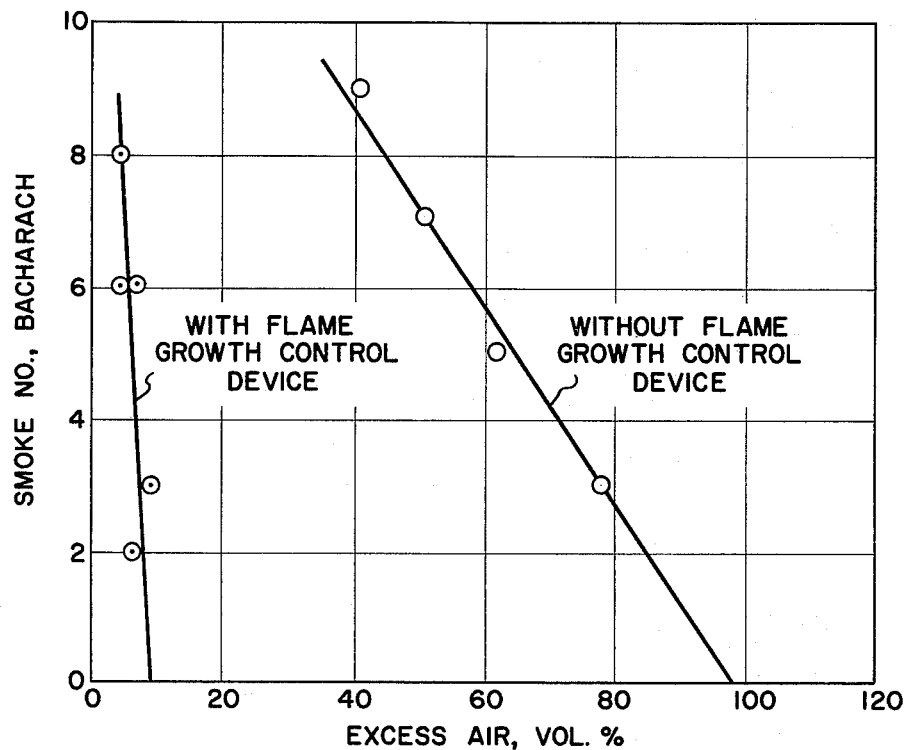

FIG. 17 represents a view in sectional elevation through a flame growth control device grid structure of spherical contour, the elements of this structure being individually of V-shaped cross section;

FIG. 18 represents a view in sectional elevation through a flame growth control device grid structure of spherical contour, the elements of this structure being individually of rectangular cross section, and FIG. 19 represents a plot of average smoke numbers in the flue gas with respect to excess air supplied to a heating furnace served by a typical gun variety oil burner for the cases of the burner provided and not provided with a flame growth control device according to this invention.

Figure 2:
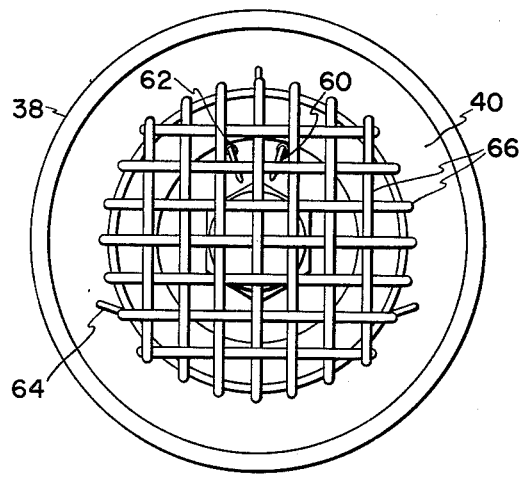
FIG. 2 represents a view taken along line 2—2 in FIG. 1 from within the combustion chamber looking toward the outlet end of the oil burner blast tube, and in particular showing the rectangular grid structure of the flame growth control device.

Referring now to the drawings in detail, especially to FIGS. 1 and 2 thereof, the combustion chamber space of a heating furnace is designated 30. A centrifugal blower 32 comprising a casing 34 and a rotor element 36 supplies air to the combustion chamber through a blast tube 38. Within this blast tube and located at its end adjacent the combustion chamber is an end cone or air orifice 40. This orifice is fastened in the blast tube by set screws or other appropriate means which locate it definitely within the blast tube but still are manipulatable to allow the orifice to be removed from the tube. On its side removed from the combustion chamber, orifice 40 is formed with a ring of turbulator vanes whereby swirl is intended to be imparted to at least some of the combustion air leaving the blast tube. Alternatively to having a removable air orifice as shown, blast tube 38 may have a welded orifice portion or one formed integrally therewith.

A pump 42 supplies fuel oil under pressure. This pump discharges through a section of flexible hose or tubing 44, and a section of rigid tubing or pipe 46 which penetrates the blower casing and extends therethrough and also through the blast tube up to a spray nozzle apparatus 48. Tubing section 46 is actually supported in a spider bushing 50 fitted inside blast tube 38 and also in sleeve or bushing 52 fitted to the outside of casing 34 of blower 32 and having a thumb screw 54 or other suitable clamping means whereby tubing sections 46 and, consequently, spray nozzle apparatus 48 may be definitely located longitudinally with respect to orifice 40. Upon screw 54 being loosened, tubing section 46 may be shifted longitudinally a small amount in bushings 50 and 52 on account of the flexible nature of tubing section 44 without disturbing oil pump 42. This pump may, like blower 32, be driven by any suitable means such as an electric motor. Further, pump 42 may be mounted and driven integrally with the blower.

The flow pattern of air for combustion discharged through the outlet opening of orifice 40 is that of a diverging cone or funnel having a boundary 56 shown in dashed lines. This cone is substantially coaxial with the blast tube and the oil spray nozzle. As a free jet, its included angle is approximately 18°. The flow pattern of oil sprayed from nozzle apparatus 48 is indicated likewise as a diverging cone having a boundary 58 shown in dotted lines. The oil spray cone is more widely diverging than that of the air discharge, and if extended long enough will pass outwardly through the air cone at some distance from the outlet end of air orifice 40. Within blast tube 38 in FIG. 1 a portion of an igniting electrode 60 is indicated in closely spaced relation to spray nozzle apparatus 48 and boundary 58 of the oil flow pattern emanating therefrom. This electrode is one of two with which the oil burner unit is provided, the other being disposed directly behind electrode 60 according to the showing of FIG. 1. It is at least partially shown in FIG. 2, and designated 62 therein.

It should be understood that both the air and oil spray discharge cones shown in FIG. 1 represent undisturbed flow patterns; that is, the air cone is depicted as it might be in the absence of an oil spray and vice versa. Both are shown also as undisturbed by the flame growth control device of this invention to be described hereinafter. With both materials, air and oil, being supplied to combustion chamber 30 simultaneously, and particularly with combustion taking place, it is obvious and indeed intended that there will be substantial interaction of the flow patterns of oil and air some distance across combustion chamber 30 from spray nozzle apparatus 48 and air orifice 40.

Affixed to air orifice 40 by means of a plurality of stiff wires or struts 64 as shown in both FIGS. 1 and 2 is an exemplary embodiment of the flame growth control device of this invention designated 66. This device is in the form of a wire grid of which the individual wire elements run either parallel or at right angles to each other, with the whole grid structure being formed to a substantially spherical contour. In a desirable arrangement, flame growth control device 66 will have the center of its spherical contour at the oil spray outlet point of nozzle apparatus 48, and arc-wise it will extend not only beyond oil spray cone boundary 58, but also at least somewhat beyond air cone boundary 56. With this geometry the flame growth control device will be equally effective for all oil fuel sprayed from nozzle apparatus 48, and the portion of it extending beyond the air cone boundary will act as a heat antenna to raise the temperature of the central portion of the device.

When a flame growth control device such as 66 is in active use, that is, when it is in place on an oil burner unit that is firing, it will receive radiant heat energy from the combustion chamber walls and from the oil flame, as well as being heated by the combustion gases through convection. Simultaneously the flame growth control device will be cooled by the air stream emanating at nearly ambient temperature from the blast tube as well as by fuel spray which may impinge upon and be evaporated from it. In some circumstances the heat input to the flame growth control device may be inadequate to warm the whole device, especially the central portion thereof, above the boiling point of the fuel. Liquid fuel striking such a relatively cool portion of the device may not be vaporized but instead simply drip downwardly therefrom to the combustion chamber floor without burning, particularly during an interval immediately after the start of operation of an oil burner unit.

One means for not only maintaining the central portion of a flame growth control device above the fuel boiling temperature with the oil burner unit in running condition, but also for bringing it up to such a temperature very quickly from a cold start is by having the device extend radially beyond the air blast cone. The peripheral portion of the device so extending will act as a receiving antenna for radiant heat energy. Energy so gathered will flow radially inwardly through the grid elements or other equivalent structure of the flame growth control device toward the central portion of the device and raise the temperature of this portion which would otherwise be unduly depressed by the air blast. Experiments have shown that an increase in temperature of this central portion from about 400° F. to about 1000° F. can be obtained by radial extension of a flame growth control device.

To continue with the detailed description of FIGS. 1 and 2, and supposing that flame growth control device 66 is of truly spherical contour and that it is indeed centered on the tip or outlet point of nozzle apparatus 48, two considerations will govern the contour radius. The first consideration is that this radius should be sufficiently small that with the oil burner unit firing, but without voltage being applied across ignition electrodes 60 and 62, there will be no burning of fuel to the right of the flame growth control device, that is, between flame growth control device 66 and nozzle apparatus 48. The second consideration is that the contour radius of the flame growth control device should be sufficiently great that with the oil burner firing there will be no great possibility of liquid oil impingement upon the wire elements of the grid. This does not mean that all of the fuel sprayed from nozzle apparatus 48 will need to be fully vaporized by the time it reaches flame growth control device 66. What it does means is that by the time fuel sprayed from the nozzle apparatus reaches the flame growth control device it should be at least sufficiently vaporized that there will be an envelope or shell of vapor around each individual particle of the fuel remaining as a liquid droplet.

It is not to be understood that for successful employment of the flame growth control device of this invention the contour assumed by this device in a way of the air and oil streams emanating from an oil burner unit must be spherical. A spherical contour is indeed desirable, but a flat contour may be used, or even one which is somewhat convex as seen from the oil spray nozzle. Likewise, although a particular flame growth control device grid does have a spherical contour, it may not be possible to have this contour centered on the tip of oil spray nozzle apparatus 48 in all cases.

In any given case with a fixed curvature of the flame growth control device grid, nozzle apparatus 48 may have to be shifted forward or back with tubing section 46 after thumb screw 54 has been released to obtain conditions of best combustion. This will be especially likely if a spray nozzle tip element giving a particular oil spray pattern be replaced with a tip element giving a somewhat different pattern. When final adjustment of the position of the nozzle apparatus has been made, its tip may well be located at least slightly eccentrically with respect to the flame growth control device. Such eccentricity can be tolerated and indeed a device of even a contour which is convex toward the spray nozzle may be used as stated already so long as the nozzle apparatus is spaced from the device to provide the two conditions described hereinbefore. In oil burners of home heating size, the spacing between these parts will usually lie in the range 1 to 3 in.

Considering the case of a flame growth control device of grid structure with wires running parallel and at right angles to each other, although this is not the only flame growth control device structure that may be used according to this invention, the center-to-center spacing of parallel wires will preferably lie in the range 1/8 to 3/4 in., more preferably being about 1/2 in. Assuming that the individual elements of the flame growth control device structure are in the form of round wires, although this is not the only form of wire or grid element that may be used according to this invention, the diameter of the wire will preferably lie in the range 0.03 to 0.250 in., more preferably being about 0.125 in.

The material of flame growth control device 66 should be one capable of withstanding temperatures up to about 2500° F. for an extended period of time. Such a material would be wrought "Inconel" which contains about 79.5% Ni, 13% Cr, 6.5% Fe, and trace amounts of Mn, Si, C, and Cu. Material selection for a flame growth control device is not, however, based solely upon consideration of extended operation at fairly steady high temperatures. Consideration must be given also to transient operation in a range of rising but still relatively low temperatures directly after an oil burner unit has been started following a significant interval of idleness. During this transient start-up period when the combustion chamber walls are relatively cold, fuel spray droplets may impinge upon the flame growth control device, and, if it too be quite cool, collect thereon and drop therefrom as liquid to the floor of the combustion chamber, and burn there in a smoky fuel-rich fashion. For very large and poorly insulated combustion chambers, the period of start-up fuel dripping may last for a significant time in the absence of special provisions to eliminate or at least reduce it.

One provision which may be made for this purpose is to utilize a material or materials of high thermal diffusivity in the construction of flame growth control devices. A device so constructed will rise rapidly in temperature upon the starting of an oil burner unit to which it has been applied, and the length of time after starting during which it will be cool enough to allow the collection of liquid fuel upon itself will be correspondingly short. To define this concept more clearly in both a qualitative and a quantitative manner, the following table has been prepared:

Table I

| Material | Thermal Diffusivity (Ft.$^2$/hr.) | Furnace Applications |
| --- | --- | --- |
| Silver | 6.6 | Large, poorly insulated units. |
| Copper | 4.4 | Do. |
| Beryllium oxide* | 2.8 | Do. |
| Molybdenum | 2.5 | Do. |
| Nickel | 0.6 | Moderately insulated units. |
| Mild steel | 0.3 | Do. |
| Stainless steel | 0.10–0.20 | Do. |
| Chrome nickel alloys ("Inconel"). | 0.10–0.20 | Do. |
| Insulating ceramics | Less than 0.10 | Well insulated units. |

*And other good conducting ceramics.

For coated metals, the composite diffusivity is a function of the individual diffusivities of the base metal and its coating material, and of the relative mass or thickness of each. Examples of coated metals are copper with a coating of chrome or flame-applied ceramic, chrome coated nickel, and chrome coated mild steel.

As indicated in Table I, material of relatively high thermal diffusivity is needed for flame growth control devices to be applied to oil burner units associated with large, poorly insulated furnaces or combustion chambers. On the other hand, with units associated with small, well insulated furnaces it is possible to use flame growth control devices constructed of materials such as ceramics or ceramic coated metals having thermal diffusivities in the middle or lower ranges. For materials such as copper, a protective coating is required to prevent oxidation. This coating may, for example, be of the chromium type. Beryllium oxide (BeO), on the other hand, requires no protective coating since it is a ceramic type of material which will neither oxidize nor corrode. Being both oxidation and corrosion proof, BeO can provide very good performance as the material of a flame growth control device for an oil burner unit even in a furnace which is large and not very well insulated.

To demonstrate clearly that high thermal diffusivity of the material of a flame growth control device does in fact serve to reduce the length of the aforedescribed fuel impingement and dripping period, the following table of experimental and observational data gathered from a poorly insulated furnace has been prepared:

Table II

| Material of Flame Growth Control Device | Thermal Diffusivity (Ft.$^2$/hr.) | Fuel Dripping Period (Minutes) |
| --- | --- | --- |
| Copper | 4.4 | 0.4 |
| "Inconel" | 0.15 | 2.0 |

The data show that as between copper and "Inconel" a substantial reduction in the length of the fuel dripping period following oil burner unit start-up is achieved through the use in a flame growth control device of the material of higher thermal diffusivity.

Use in a flame growth control device of a material of high thermal diffusivity, and of a particularly sized design calling for an appreciable antenna area to extend beyond the air blast cone of the oil burner unit to which the device is to be applied of course represent complementary and not contradictory concepts. Both uses contribute toward quick raising of the temperature of the flame growth control device, particularly the central portion thereof, to a value above the boiling temperature of fuel oil upon the starting of an oil burner unit.

Another means of achieving this quick raising of temperature or an effect equivalent thereto would be by having a resistance wire embedded in, wrapped around, or itself forming the grid elements of the flame growth control device, with the leads of this wire being connected to a source of electrical power through the main switch of the oil burner unit controlling the air blower and the fuel oil pump. A delay element would desirably be provided to retard the starting of at least the oil pump after throwing of the main switch until current had flowed through the resistance wire long enough to heat the flame growth control device considerably. A thermal switch would desirably be provided also which would open to interrupt the flow of current to the device after the temperature in the combustion chamber had risen to a certain predetermined value. This switch would close again upon shutting down of the oil burner unit and cooling of the combustion chamber to prepare the resistance wire circuit for energization upon the next starting up of the oil burner unit.

Still another means of achieving quick raising of the temperature of a flame growth control device or an effect equivalent thereto would be by having the oil burner unit with which the device is associated provided with a suitable pilot flame action. This action would be such that a pilot flame would be ignited prior to full burner start-up when the main switch was thrown, this flame being of a disposition and strength to play upon the flame growth control device and heat it appreciably.

Figure 3:
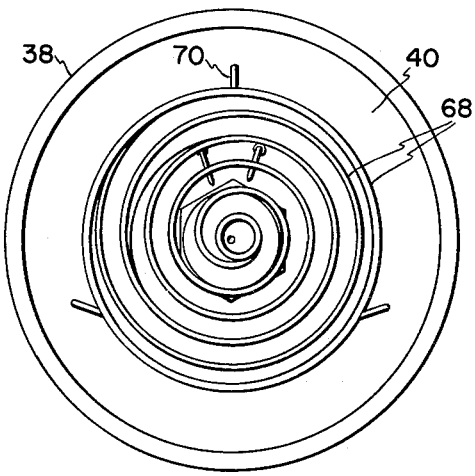
FIG. 3 represents a view taken similarly to that of FIG. 2, but showing the oil burner unit provided with a flame growth control device in the form of a wire wound as a spiral.

Referring next to FIG. 3, a view is given generally similar to that in FIG. 2 of an alternate form of the flame growth control device of this invention. In FIG. 3 the flame growth control device designated 68 is configured as a spiral, and is supported from air orifice 40 by struts 70. A spiral is not, of course, the only form that the device can take other than that of the rectangular grid shown in FIG. 2. Another form would be that of a polar grid. Still another would be that of a plurality of discrete particles stranded on very thin wires at essentially the crossing points of the wires of the grid structure of FIG. 2. Certain other particular configurations of the flame growth control device of this invention are described hereinafter.

Figure 4:
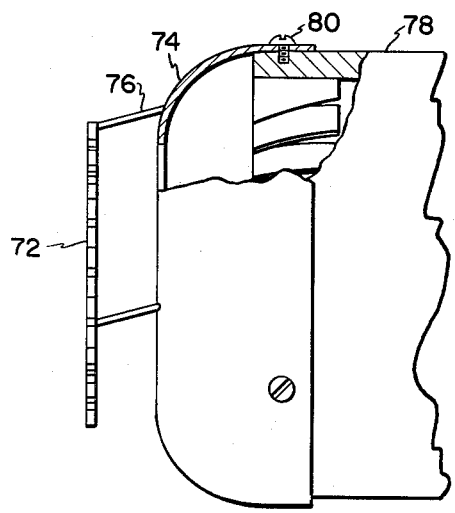
FIGS. 4 and 5 represent edge and frontal elevation views of a flame growth control device attached to the air orifice of a burner blast tube, this device being in the form of an expanded metal grid.

Referring next to FIGS. 4 and 5, a flame growth control device 72 of flat contour and having the form of an expanded metal grid is attached to an air orifice 74 by a plurality of straight struts 76. The air orifice itself, which is somewhat different in form from orifice 40 shown in FIGS. 1, 2, and 3, is mounted externally upon burner blast tube 78, and attached thereto by a plurality of screws 80. Struts 76 are so disposed relative to device 72 and air orifice 74 that the orifice may be mounted on blast tube 78 in a way to cause all struts to be pitched at least somewhat downwardly from the air orifice toward the flame growth control device. This prevents any liquid fuel spray which may accumulate temporarily on the flame growth control device from flowing back along the struts toward the air orifice and the blast tube, and away from the region of combustion.

Struts 76 are so further disposed relative to device 72 and air orifice 74 that with the orifice mounted on the blast tube and the struts pitching somewhat downwardly from the orifice toward the flame growth control device, all individual grid elements of the device are similarly and symmetrically disposed closer to the horizontal than to the vertical. This orientation of the grid structure provides the minimum average descent for a liquid fuel droplet per unit length of its travel along any individual element of the grid. In this way an extended residence time on the grid is made possible for oil droplets impinging thereupon when an oil burner unit is started up from cold condition, and thus there is greater opportunity for these droplets to become vaporized and then turned in the desired manner before dripping off of the flame growth control device onto the floor of the combustion chamber.

In an exemplary apparatus embodiment of this invention, a flame growth control device generally similar to device 72 of FIGS. 4 and 5 could have the following approximate dimensions:

|  | In. |
|---|---|
| Overall diameter | 2¼ |
| Element width | 0.10 |
| Element thickness | 0.050 |
| Element spacing | 0.50 |

Figure 6:
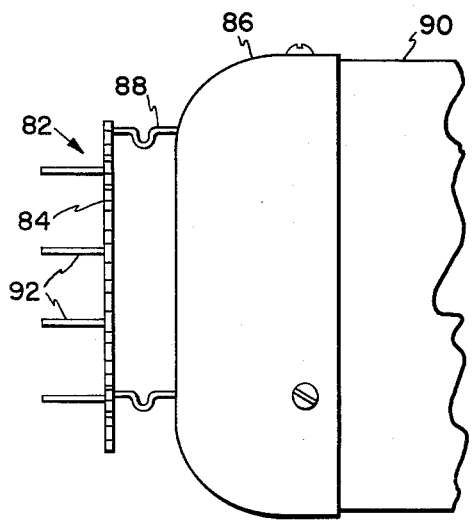
FIGS. 6 and 7 represent edge and frontal elevation views of a flame growth control device similar to that shown in FIGS. 4 and 5, this device being provided with a plurality of axially extending antennae for heat reception.
Figure 7:
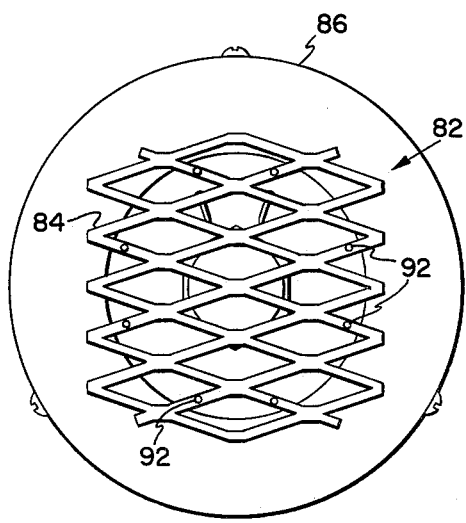

Referring next to FIGS. 6 and 7, a flame growth control device 82 comprising a grid structure 84 is attached to an air orifice 86 by a plurality of struts 88 each of which is characterized by a jogged or pocketed region. Orifice 86 is similar to orifice 74, and it is mounted upon and attached by screws to a blast tube 90 similar to blast tube 78. Struts 88 extend out generally horizontally from air orifice 86 to grid structure 84. Any incipient running back of liquid fuel from the flame growth control device to the air orifice along the struts is, however, arrested by the jogged or pocketed regions therein which act as fuel traps. Struts of the design shown in FIG. 6 may be used alternatively with straight, downwardly pitching struts of the kind shown in FIGS. 4 and 5 as well as in other figures. The important thing in any structure, however, is that there should not be any easy path for gravity-induced flow of liquid fuel back from a flame growth control device toward or into the oil burner unit which it is serving.

Grid structure 84 of flame growth control device 82 is generally similar in form and similarly oriented to the grid structure of device 72 shown in FIGS. 4 and 5. In addition to grid structure 84, however, flame growth control device 82 comprises a plurality of rod elements 92 affixed to grid structure 84 in such a way as to extend therefrom away from air orifice 86 and substantially parellel to the axis of flow of oil spray and air from blast tube 90 and the air orifice. Rod elements 92 act as receiving antennae for radiant heat energy from the oil burner flame. Heat radiated to these rods flows along them to grid structure 84, and helps to maintain the temperature of this structure at a high value.

From the foregoing it will be understood that axially or longitudinally extending rod elements 92 serve the same purpose for grid structure 84 as does any portion of this structure itself which extends radially beyond the boundaries of a stream of air from blast tube 90 discharged through air orifice 86 and flame growth control device 82, such portion being a receiver of radiant heat energy for the benefit of the central portion of the grid structure as explained earlier in connection with FIG. 1. Use of both longitudinally extending rod elements and a radially extensive peripheral or outer grid structure portion in the same flame growth control are by no means mutually inconsistent. However, when longitudinal extending elements such as rods 92 are employed it will be possible to effect at least some reduction in overall diameter or transverse extent of the flame growth control device, and still have an adequate heat flow to the normally relative cool central portion of the device.

The possibility of using longitudinally extending rods such as 92 instead of an unduly radially extensive peripheral or outer grid structure portion to maintain the temperature of the central portion of a flame growth control device at a temperature at least somewhat above the boiling point of fuel oil is a practically significant one. This is because a flame growth control device cannot be extended radially indefinitely, possibly not enough to provide a sufficiently large radiant heat receiving antenna in all cases. Diameter of the device is limited to about twice the diameter of the outlet opening of the air orifice with which the device is associated. If the flame growth control device has a diameter appreciably greater than this, it will be in danger of overheating at its outer edge.

Figure 8:
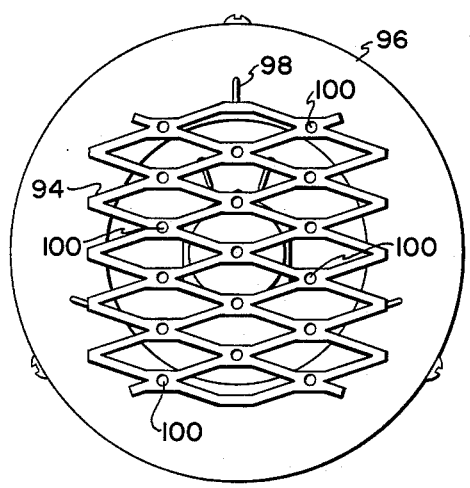
FIG. 8 represents a frontal elevation view of a flame growth control device similar to that shown in FIG. 5, this device being characterized by a plurality of ports at the crossings of its grid elements for the arresting of liquid fuel accumulation.

Referring next to FIG. 8, a flame growth control device 94 in the form of a grid structure generally similar to device 72 is attached to an air orifice 96 by a plurality of struts 98. Orifice 96 is similar to orifice 74, and struts 98 are similar to struts 76. Flame growth control device 94 itself has the particular difference from device 72 that at the crossings or junctions of its grid elements it is characterized by a plurality of through-going ports 100. These ports serve to arrest the accumulation of liquid fuel which has impinged and been retained upon the grid elements of flame growth control device 94, and started to run down these elements to gather in sufficient thickness to drop off the device toward the combustion chamber floor. Visual and photographic observations have shown that when liquid fuel accumulation on a flame growth control device does take place, it takes place only on the downstream side of the device, that is the side of the device opposite that one exposed to the oil spray nozzle apparatus of the oil burner unit with which the device is associated.

As a trickle of fuel oil runs down any grid element, it will very shortly have to flow around or across some port 100 in order to continue its journey. Jets of air will of course be issuing through these ports in the instance of normal oil burner operation, and such jets will have a significant effect of blowing off liquid fuel trying to flow down the grid elements; that is, not all of the fuel flowing down the grid elements during the burner start-up period, for example, will be able to get past ports 100 on its way to thick accumulation at and dripping from the bottom of the flame growth control device. Fuel which is blown off of device 94 by the jets from ports 100 will be discharged toward the regular combustion region of a furnace, and be able to burn there in a useful manner.

Referring next to FIG. 9, a flame growth control device 102 in the form of a grid structure generally similar to device 72 is attached to air orifice 104 by a plurality of struts 106. Orifice 104 is similar to orifice 74, and struts 106 are similar to struts 76. Flame growth control device 102 itself has the particular difference from device 72 that it is characterized by a cutout region 108 generally at a radius from its normal axial line corresponding to the radial distance out from the axis of the burner blast tube whereon air orifice 104 is mounted of the igniting electrodes 110 and 112 within the tube. Air orifice 104 is so oriented with respect to the blast tube whereon it is mounted that cut out region 108 of flame growth control device 104 is in general longitudinal alignment with electrodes 110 and 112.

The purpose of cut out region 108 is to eliminate a possible problem of coke formation on the flame growth control device because of operation of the oil burner ignition system. This system may operate continuously while the oil burner unit is running, or it may operate for only a brief period of time, for example, about 1½ minutes, upon the starting-up of the unit. When a part of the structure of a flame growth control device is located directly downstream from the igniting electrodes, an incipient difficulty exists in that the spark struck between the two electrodes will have an effect of polymerizing some oil in the spray emanating from the nozzle apparatus, with the polymerized material tending to agglomerate as coke on the aforementioned part of the flame growth control device. The rate of coking may be such for both continuous and intermittent operation of the ignition system that the effective geometry of the flame growth control device becomes altered to the extent of significantly impairing the operation of the oil burner unit. By having a flame growth control device characterized by a properly oriented and sufficiently large cut out region such as 108, an escape opening is provided through which the coke-forming fuel or fuel/air mixture can flow downstream of the electrodes without significant impingement upon any portion of the flame growth control device structure.

Referring next to FIGS. 10, 11, and 12, flame growth control devices in the forms of a perforated plate 114, a series of concentric rings 116, and a spoked hub, star, or multibladed fan 118 are attached respectively to air orifices 120, 122, and 124 by pluralities of struts 126, 128, and 130. Orifices 120, 122, and 124 are similar to orifice 74, and struts 126, 128, and 130 are similar to struts 76. Flame growth control devices 114, 116, and 118 themselves are representative of grid structures which although they are not necessarily preferred embodiments of the present invention are nevertheless utilizable within the scope of this invention.

Referring next to FIG. 13, a flame growth control device 132 in the form of mortar-work or a rectangular grid with one group of parallel elements of a discontinuous nature is attacked to air orifice 134 by a plurality of struts 136. Orifice 134 is similar to orifice 74, and struts 136 are similar to struts 76. Flame growth control device 132 itself is characterized by a cut out region 138 which corresponds in location and purpose to cut out region 108 of flame growth control device 102 shown in FIG. 9. This location and purpose are of course considerations of general nature which have significance in the design of all flame growth control devices otherwise made according to this invention; that is, these considerations do not apply only in the cases of the devices of FIGS. 9 and 13.

As air orifice 134 is oriented with respect to the burner blast tube on which it is mounted, the continuous parallel elements of the grid structure of flame growth control device run horizontal while its discontinuous elements run vertically. This insures that any liquid fuel impinged and retained upon the grid will have a relatively difficult path to travel downward prior to dripping off of the grid. Residence time of liquid fuel on the flame growth control device will thus be increased giving this fuel a greater opportunity to be vaporized and burned in the normal, desired manner. In an exemplary apparatus embodiment of this invention, a flame growth control device generally similar to device 132 of FIG. 13 could have the following approximate dimensions:

| | In. |
|---|---|
| Element width | 0.10 |
| Element thickness | 0.050 |
| Element spacing (continuous elements) | 0.25 |
| Element spacing (discontinuous elements) | 0.50 |

Referring next to FIG. 14, an alternate form of this invention is shown wherein a flame growth control device 140 of rectangular grid form such as that shown in FIGS. 1 and 2 is fastened by a plurality of struts 142 to a nozzle heat shield 144 which is in turn mounted on spray nozzle apparatus 48 by a plurality of set screws 146 and lock nuts 148. Heat shield 144 is characterized by an outwardly flaring end region 150 at its end which is upstream with regard to oil flow through nozzle apparatus 48, a drain hole 152 for keeping its interior cleared of any possible accumulation of liquid fuel, and a plurality of crimps 154 at its downstream end which serve to locate the heat shield longitudinally on the nozzle apparatus and to align it radially with respect to spray nozzle tip element 156 of this apparatus.

Heat shield 144 is characterized further by an inside diameter or bore which is enough larger than the governing outside diameter of oil spray nozzle apparatus 48 that there is a continuous annular passage of significant radial width between the heat shield and the nozzle apparatus. This passage insures that there will be a flow of air closely around the nozzle apparatus, particularly around tip element 156 thereof, during the course of normal operation of the oil burner unit. Some air flowing down the burner blast tube will be guided in around the nozzle apparatus by flaring end region 150 of the heat shield, and will then pass through the shield to sweep along tip element 156 and out between crimps 154 in the shield. This air flow will have a significant effect to keep the nozzle tip cool, an effect in addition of course to the primary action of the heat shield of protecting tip element 156 against undue radiant heating from the combustion chamber. Excessive heating of the nozzle tip element may cause the formation of coke and varnishlike material within its swirl slots with resulting disruption of the normal oil spray pattern if not an eventual blocking of oil flow altogether.

The outside diameter of flame growth control device 140 as shown is less than the inside diameter or bore of air orifice 40. Such an arrangement of diameters allows the withdrawal of the nozzle apparatus including the heat shield and flame growth control device from the oil burner unit rearwardly through the blast tube; that is, it allows access to the nozzle apparatus without the need of entry into the combustion chamber or dismounting of the burner blast tube from the furnace wall wherein it is set. On the other hand, this arrangement of diameters means that basic grid structure 158 of flame growth control device 140 cannot extend beyond the boundaries of the slowly expanding air blast leaving orifice 40, and so the device cannot have any radially extensive receiving antenna for radiant heat energy such as has been described as characterizing flame growth control device 66 of FIGS. 1 and 2, for example. Accordingly, besides its basic grid structure, flame growth control device 140 comprises a plurality of longitudinally extensive rod elements 160 similar in form and purpose to elements 92 affixed to grid structure 84 of flame growth control device 82 shown in FIGS. 6 and 7.

The assembly of the flame growth control device and heat shield shown in FIG. 14 is capable of being installed quite easily in an existing oil burner unit, more easily in many cases than installing a new air orifice with flame growth control device attached. Once installed according to FIG. 14, the distance from the grid structure of device 140 to the outlet end of spray nozzle apparatus 48 is fixed. This is desirable in the sense that once the proper distance has been determined and the parts involved designed and manufactured accordingly, the flame growth control device and nozzle apparatus may be assembled and used for a while, taken apart for servicing as needed, and thereafter reassembled without any experimentation.

Referring next to FIG. 15, another alternate form of this invention is shown wherein a flame growth control device 162 is fastened by a plurality of struts 164 to an oil spray nozzle tip element 166. Flame growth control device 162 is generally similar to flame growth control device 140 shown in FIG. 14; that is, it comprises a basic grid structure 168 and a plurality of longitudinally extensive rod elements 170 affixed thereto. Spray nozzle tip element 166 is generally similar to tip element 156 shown in FIG. 14, an indeed may be deemed identical to it for purposes of substitution into nozzle apparatus 48. For such substitution, a heat shield will be provided which is appropriately slotted to receive struts 164; that is, assuming use of a heat shield is deemed necessary.

It will be seen that with flame growth control device 162 supported directly from nozzle tip element 166 installing the device will amount, in effect, to no more than changing a tip element on the nozzle apparatus. This is a standard operation in the servicing of oil burner units, and the necessary access to burner parts for effecting it without having to dismount the oil burner unit from the furnace with which it is associated is almost always provided. In keeping with the arrangements shown in FIG. 14, flame growth control device 162 will be kept to a sufficiently small diameter that it can be pushed and pulled through air orifice 40 without difficulty.

Referring next to FIG. 16, a combustible mixture 172 of oil and air is indicated by arrows as approaching the several horizontal grid elements 174 of a flame growth control device which may be considered as similar to device 66. For purposes of clarity of illustration of flow of the unburned and burned materials, vertical elements of the grid are not shown in FIG. 16. Likewise and for the same reason, only the sectioned surfaces of the horizontal elements are shown.

As mixture material 172 arrives at and passes between grid elements 174, flow accommodation will take place through changes in both velocity and density. The reduction in stream boundary cross section area available to the flowing mixture on account of the frontal area presented by the grid elements will tend to increase the stream velocity. On the other hand, some compression or increase in density of the mixture material will take place upstream from the flame growth control device, and this will tend to decrease the stream velocity. Important for this invention, however, is the fact that as the divided streams of mixture material flow past and beyond grid elements 174 there will be eddy current regions 176 set up downstream of each of these elements. In these regions the unburned mixture will still be in a state of high turbulence, although on a scale reduced from that obtaining on the upstream side of the grid elements, and, most importantly, it will have a low net forward velocity. Conditions for combustion within the eddy current regions 176 will thus be much better than they are, for example, in the rapidly moving core of unburned mixture 172 to the right of grid elements 174.

Suppose now that voltage be applied across a pair of igniting electrodes such as electrodes 60 and 62 to draw a spark between them and ignite at least some of the oil and air mixture leaving the blast tube of the oil burner unit with which the illustrated flame growth control device is associated, and cause the immediately surrounding mixture material to be warmed. When this flaming and warmed material reaches grid elements 174 at least some of it will flow into eddy current regions 176. In these regions the mixture material which is already burning will continue to burn, while that which has been heated to combustion temperature by the spark and/or the material initially ignited by the spark but which itself has not yet been ignited will burst into flame because of the very good conditions for combustion obtaining in the eddy current regions. Once combustion has been established in at least some eddy current regions 176, and its establishment will take place very rapidly upon a spark being drawn between the electrodes, these eddy current regions will be regions of steady burning as fresh, unburned mixture material 172 flows into them. Application of voltage across the electrodes may be terminated to discontinue the ignition spark.

Products of combustion generated in the eddy current regions where burning is taking place must, of course, flow away downstream of these regions in any steady state operation of the oil burner unit. As these flaming products flow downstream they will expand because of their temperature which is much higher than that of the unburned material from which they were generated, and also because of diffusion effects. The flaming and expanding gaseous materials flowing from some of the eddy current regions will, of course, be in contact with those portions of unburned mixture 172 which flowed through adjacent grid elements 174 without being drawn into these regions. Providing that the eddy current regions are individually of sufficient size and that they are sufficiently closely spaced, the flame fronts which define the expanding regions of products of combustion emanating from the eddy current regions will expand to pinch off the streams of unburned mixture passing through adjacent grid elements 174. As this unburned material meets a flame front or a flame front moves out to meet it, it will itself be ignited to sustain the flame.

Additionally and very importantly, heat released by one flaming eddy current region and the products of combustion flowing from it will cause ignition of unburned mixture material in an adjacent eddy current region not initially flaming. Ignition of material in such a region and the flow of hot, expanding products of combustion from it will cause pinching off of at least one more stream of unburned mixture material flowing between grid elements 174. Also, of course, it will cause ignition of mixture material in still another eddy current region. It will thus be seen that material in one eddy current region after another will be set burning in succession for a rapid but controlled growth of the oil burner flame on the downstream sides of the grid elements, and with attendant pinching off by flame fronts of streams of unburned mixture material flowing between grid elements 174. In steady state conditions, therefore, a substantially continuous if irregularly shaped flame front 178 will extend from element to element of the grid. This front will also extend beyond the outermost elements in the bounding region or sleeve of the flowing oil and air mixture where velocities are comparatively low. Downstream of flame front 178 there will be a substantially solid or transversely continuous region of flaming material 180 all across the free jet path of air emanating from the blast tube of the oil burner unit. Essentially all of the fuel sprayed from the nozzle apparatus of the unit will thus be burned within the main air stream.

It has been indicated that for the aforedescribed flame growth to take place across grid elements 174 there are size and spacing requirement of the eddy current regions. For a given spacing of these regions, the size of individual regions may not go below a minimum value and still have enough heat emitted from any individual region which is flaming to ignite an adjacent eddy current region which is not. Correspondingly for a given size of individual eddy current regions, the spacing of adjacent regions may not go above a maximum value and still have progressive region-by-region ignition. Further, although the mixture material in adjacent eddy current regions be ignited, there will be a minimum value of region size and a maximum value of region spacing for given operating conditions to allow flame fronts to develop of sufficient size to pinch off the stream of unburned material passing between the two flaming regions. If these minimum size and maximum spacing requirements be not satisfied it will be the flame fronts from the eddy current regions which are pinched off by the unburned mixture streams.

Eddy current region size and the spacing of these regions are directly related to the size and spacing of grid elements 174. Preferred ranges of values of these quantities have been given hereinbefore for the case of a flame growth control device having its elements running parallel and at right angles to each other. The stated preferred ranges are not peculiar to this rectangular grid construction only, but are of general significance. For example, in the spirally wound flame growth control device 68 shown in FIG. 3 the center-to-center spacing of adjacent turns on any essentially radial line will preferably lie in the range ⅛ to ¾ in. Likewise, assuming that a round wire is used for this spiral, its diameter will preferably lie in the range 0.03 to 0.250 in.

Referring next to FIG. 17, a flame growth control device 182 of spherical contour is shown comprising a plurality of grid elements 184 which are individually of V-shaped cross section. One advantage of such a cross section compared with that of solid round elements 174 shown in FIG. 16 is that for equal effectiveness in setting up eddy current regions on the downstream side of the flame growth control device a lower weight of metal or other material will be adequate for the grid structure. With this lower weight of metal, flame growth control device 182 will have a reduced heat capacity and so will come up to combustition chamber operating temperature more rapidly. Said another way, flame growth control device 182 will have less effect to chill the oil and air mixture emanating from an oil burner unit upon the starting of the unit with the combustion chamber of the furnace with which it is associated in cold condition. An additional advantage of grid elements of V-shaped cross section oriented as shown is that they will effect such division and guidance of the approaching oil and air mixture stream to minimize likelihood of impingement of liquid fuel drops on the grid elements themselves. It is to be understood, of course, that a flame growth control device such as device 66 may be constructed of elements which are round in cross section but not solidly round; that is, the elements may be tubular. Such construction will have at least the advantage of reduced weight of structural material.

Referring next to FIG. 18, a flame growth control device 186 of spherical contour is shown comprising a plurality of grid elements 188 which are individually of rectangular cross section. As shown, these elements are of unequal cross section dimensions; that is, they have much more the aspect of flat strips rather than square bars. In this aspect, grid elements 188 are so arranged that their wide sides will be presented toward the oil spray nozzle apparatus and the blast tube of any oil burner unit with which flame growth control device 186 is associated. Such a presentation will be quite effective for setting up eddy current regions on the downstream side of the device. In this embodiment, a positive electrical charge is also applied to the device 186 through a suitable electrical connection 186a for the reduction of coke deposits thereon as explained hereinbelow.

Referring finally to FIG. 19, the data plotted therein were gathered in the course of operating a Model BD high pressure oil burner unit constructed by Gilbert & Barker Manufacturing Co., West Springfield, Mass. This unit was firing a Series RB-43 furnace type boiler manufactured by the U.S. Radiator Corp. having a combustion chamber with floor dimensions of 11.8 in. x 11.8 in. and height of 18 in. The fuel used was No. 2 heating oil, and it was fed at the rate of about 0.6 gal./hr. Atomizing pressure of the oil was about 100 p.s.i.g., and its atomizing temperature was about 135° F. The air orifice of the oil burner unit had an inside diameter of about 1⅞ in., and the unit was provided with a spray nozzle tip element made by the Monarch Manufacturing Works, Inc., Philadelphia, Pa., which generated an oil spray cone of about 80° included angle and solid transverse pattern. A copper heat shield was used with the spray nozzle apparatus. Spark ignition was used only at the start of operations, and the overfire draft in the combusion chamber was about 0.015 in. $H_2O$.

The flame growth control device employed for one set of the plotted values of smoke numbers and excess air was of rectangular grid construction, and had a flat contour. Individual elements of the grid were all solid round wires having a diameter of about 0.062 in., and a center-to-center spacing of about ¼ in. for adjacent parallel elements. The distance from the outlet end of the nozzle tip element to the flame growth control device was about 1 in. measured on an axial line of the nozzle apparatus.

Measurements of smoke numbers of the furnace flue gas were made by sample withdrawals just at the gas exit of the boiler after the products of combustion had left the heat transfer surfaces, and subsequent grey scale comparisons according to the standard Bacharach technique. Excess air values were calculated from measured values of carbon dioxide content of the flue gas. High values of volume percent carbon dioxide meant low values of volume percent excess air. The plotted data show clearly that for a given value of Bacharach smoke number the percent excess air required in the case of the oil burner unit equipped with a flame growth control device according to the present invention was and will be a great deal less, in some instances an order of magnitude less, than that required for the unit lacking this device.

This decrease in percent excess air will result in an increased furnace efficiency as indicated hereinbefore. Correspondingly, for achievement of a given acceptable efficiency at any particular time the use with an oil burner unit of the flame growth control device of this invention will give much cleaner or more nearly smokefree combustion than that obtaining in the absence of it. This will have the collateral benefit of allowing greatly prolonged maintenance of the given efficiency before cleaning of heat transfer surfaces of the furnace for removal of soot deposits is necessary.

When a flame growth control device according to this invention is applied to an existing oil burner unit, the device will not by itself prevent the delivery of excess air at the originally designed rate of the unit although such rate is now too great. Of course the benefit of the invention can be realized by providing the unit with a new and smaller air blower. Such a substitution may, however, be unduly inconvenient and expensive, especially in view of the availability of a method of reducing air delivery to the combustion chamber which does not require any new burner parts or the institution of any new operating procedure. This method calls for drilling or otherwise providing one or more outlet openings in the blower casing of the unit on the output side of the blower or in the blast tube to allow some of the air discharged by the blower to bleed away without ever reaching the combustion chamber. Such outlet openings provided in casing 34 of blower 32 of FIG. 1 are designated 190. With these openings in existence, the blower can run as originally designed, but there will be a reduced delivery of air to combustion chamber 30.

Another modification which it may be desirable to make to prior-installed equipment when a flame growth control device is applied to an existing oil burner unit is that of reducing the size of the combustion chamber with which the unit is associated. In particular, it may be desirable to decrease the combustion chamber length. Such a decrease or shortening is an effective way in which to increase the radiant heat energy transmitted to the flame growth control device. A reduction in combustion chamber size may be achieved by lining the original chamber with a flexible type of insulating material, or by building up with insulating bricks within the chamber to form a new back or downstream wall.

The possibility of coke formation on a flame growth control device has been mentioned hereinbefore, and the method of avoiding this so far indicated is that of cutting away the structure of the device which would otherwise be present substantially directly downstream from the igniting electrodes of the oil burner unit. Such a method or solution is exemplified by cut out regions 108 and 138 in flame growth control devices 102 and 132 of FIGS. 9 and 13 respectively. This is not, however, the only solution available. Three others are known, each of which allows the flame growth control device to remain intact.

The first of these other solutions is that of applying a positive electrical charge on the flame growth control device. It has been established that the finely divided smoke particles of polymerized hydrocarbons flowing toward a combustion chamber from the spark struck between igniting electrodes carry a positive charge. Accordingly these particles will stick to and agglomerate to a substantial coke formation upon flame growth control device structure which is either electrically neutral or negatively charged. On the other hand, if the structure be positively charged to a potential as low as 6 volts there will be definite repulsion between it and the smoke particles, and these particles will flow through the structure without any significant adherence thereto.

The second of these other solutions is that of creating a condition of high excess air locally around the igniting electrodes. It has been established that a spark generated at about 10,000 volts, a typical igniting potential, does not cause a significant amount of smoke when it is struck in a region of high excess air. Specifically a test has been made in which auxiliary air was injected into an oil burner unit just upstream from the igniting electrodes through a small tube 200 (see FIG. 1) leading to the spark zone. The total quantity of air used for combustion was adjusted to provide a smoke number of 5 in the flue gases. Test results obtained are tabulated as follows:

*Table III*

| Vol. Percent of Total Air Injected Upstream of Spark | Flue Gas Composition | | Coke Level on Flame Growth Control Device |
|---|---|---|---|
| | Excess Air, Vol. Percent | Smoke No. | |
| 0.7 | 23 | 5 | Very heavy after 20 minutes. |
| 2.3 | 11 | 5 | Light after 40 minutes. |

As shown by Table III, substantially better performance was obtained at the higher level of air injection. Excess air requirements were cut in half at the number 5 smoke level. Rate of coke formation on the flame growth control device was reduced drastically. It is reasonable to expect that at some still higher level of air injection upstream of the spark coking of the flame growth control device could be substantially eliminated altogther. Instead of using special auxiliary air injection by a tube, the desired beneficial effect of coke formation inhibition might be achieved by the simpler means of a suitably positioned air deflector or scoop within the burner blast tube to give an increased flow of air locally in the spark zone.

The third of these other solutions is to provide a means of eliminating the ignition voltage (the approximately 10,000 volts) as rapidly as possible after a flame has been established. If the ignition voltage be cut off in the time range 2 to 10 seconds after establishment of the flame, coke formation on the grid structure will not become a problem.

It is intended to secure protection by Letters Patent of the foregoing-described invention in all its aspects to the broadest extent that the prior art allows.

What is claimed is:

1. The method of reducing the amount of excess air required to produce smoke-free combustion from an oil burner of the type employing an igniter, a vaporizable liquid fuel spray nozzle and an air blast tube which combine to direct a diverging jet of combustible mixture into a fire box with the fluid velocity at the center of said jet substantially higher than the fluid velocity at the boundaries of said jet, comprising the steps of introducing a pervious metallic obstruction into a relatively low temperature zone and central area of high velocity where combustion does not normally occur for creating eddy current regions of high turbulence and low net forward velocity to permit localized ignition of the combustible air/fuel mixture downstream of said obstruction in the general zone of high velocity, and extending portions of said obstruction radially outward from, and exterior of, said diverging jet into the fire box area for increasing the radiant heat absorption capacity of said obstruction for conducting heat to the cool central portion of said obstruction in the path of the fuel spray and air blast to assist in the vaporization of the fuel spray impinging thereon whereby excess dripping of sprayed fuel striking the obstruction is prevented.

2. The method of claim 1 including the additional step of further extending portions of said obstruction downstream of said obstruction to absorb heat from an ignited area of the oil burner flame downstream of said obstruction and conducting said heat to said obstruction to assist in the vaporization of liquid fuel impinging upon said obstruction.

3. The method of claim 1 including the further step of introducing a localized amount of excess air in an area upstream of said igniter to prevent coking of the surface of said obstruction downstream of said igniter.

4. The method of claim 1 including the further step of applying a positive charge to said obstruction for preventing a coke formation thereon.

5. The method of raising the efficiency of an oil burner of the type employing a fuel spray nozzle and an air blast tube which combine to direct a jet of predetermined diameter of combustible mixture into a fire box with the fluid velocity at the center of said jet substantially higher than the fluid velocity at the boundaries of said jet, comprising the step of introducing a pervious metallic obstruction member transversely across the entire predetermined diameter of said jet and extending laterally therebeyond, said obstruction member being located at a distance downstream of said jet where the velocity at the center of said jet prevents propagation of the flame front thereto for creating a predetermined pattern of local eddy current regions of low net forward velocity downstream of the pervious member to thereby permit flame propagation back toward said burner in said central area of high velocity whereby the percentage of excess air may be reduced while maintaining substantially smoke-free combustion said laterally extending portions of said obstruction member increasing the radiant heat absorption capacity of said obstruction member and conducting heat toward the center of said jet.

6. The method of claim 1 including the further step of eliminating a portion of said obstruction directly downstream of said igniter to prevent coking of said obstruction.

7. Means for reducing the amount of excess air required to produce smoke-free combustion in an oil burner of the type employing a fuel spray nozzle and an air blast tube surrounding said nozzle which combine to direct a jet of combustible mixture of predetermined diameter into a fire box with the fluid velocity at the center of said jet substantially higher than the fluid velocity at the boundaries of said jet, said means comprising a metallic grid, and means for mounting said grid transversely of the air flow from said tube, and spaced a distance downstream from said fuel spray nozzle where the velocity at the center of said jet prevents propagation of the flame front, said grid establishing a predetermined pattern of local eddy current regions of high turbulence and low net forward velocity in the central area of high general fluid velocity to thereby permit flame propagation to said area so that smoke-free combustion may be obtained with a minimum amount of excess air, said grid including peripheral portions extending radially outward beyond the boundaries of said jet into a relatively low velocity and high radiant heat absorption section of said fire box to thereby conduct heat to the central portion of said grid to assist in the vaporization of the cool fuel spray striking said grid.

8. The combination of claim 7 wherein said metallic grid includes a plurality of integrally connected intersecting bar elements forming therebetween a plurality of diamond shaped apertures.

9. A high efficiency oil furnace requiring a minimum amount of excess air for substantially smoke-free combustion comprising, in combination, combustion chamber means having an aperture therethrough, and oil burner means arranged to feed a mixture of fuel and air through said aperture; said burner means including, nozzle means for spraying liquid fuel, blower means for directing a predetermined diameter jet of high velocity and relatively cool air about said nozzle means, igniter means for initiating combustion of the mixture of fuel and air, and means for inducing combustion of the fuel/air mixture in a central area of the jet having a flow velocity sufficiently high to normally prevent propagation of the flame front thereto; said combustion inducing means comprising metallic grid means located transversely across the burner flame and through said normally nonignited central area, whereby a pattern of high turbulence and low net forward velocity areas is created in said central area to establish burning therein, said grid means including peripheral edge portions extending exteriorly of said predetermined diameter jet of cool air into said combustion chamber means for absorbing radiant heat therein and conducting said heat to a central portion of said grid in direct contact with liquid fuel spray from said nozzle means for vaporizing the fuel striking the central portion of said grid means.

10. The combination of claim 9 wherein said grid means includes a void area in axial alignment with said igniter means.

11. The combination of claim 9 including means for directing a localized excess of air to the area of said igniter means to prevent coking of said grid means downstream thereof.

12. The combination of claim 9 including means for applying a positive charge to said grid means for preventing a coke formation thereon.

13. In a fuel burner characterized by a combustion zone and means for propelling finely divided relatively cool liquid fuel and ambient temperature combustion air along an axis projecting into said zone at a relative high forward velocity around said axis so that combustion in a central area immediately around said axis is relatively incomplete and inefficient whereas an annular pattern of flame with more complete combustion is produced farther away from said axis, the improvement which comprises placing a small metallic grid in said central area transverse of said axis, said grid consisting of a series of alternate bar elements and openings designed and adapted to substantially reduced the forward velocity in said central area and to cause small eddy currents downstream of said bars, whereby efficient combustion in the central area of high turbulence is obtained, said grid including portions extending exteriorly of the path of the liquid fuel and combustion air to absorb heat by radiation and conduct said heat to the central portion of said grid in the path of said cool liquid fuel.

14. Improvement according to claim 13 wherein the grid is placed essentially in the plane where the annular pattern of flame starts.

15. Improvement according to claim 13 wherein the grid is equipped with radiating antennae projecting downstream to further raise the temperature of said grid.

References Cited by the Examiner

UNITED STATES PATENTS

| 738,509 | 9/1903 | Wilson | 158—73 |
| 2,220,603 | 11/1940 | Hirtz et al. | 158—23 |
| 2,604,936 | 7/1952 | Kaehni et al. | 158—113 |

FREDERICK L. MATTESON, JR., *Primary Examiner.*

MEYER PERLIN, *Examiner.*

E. G. FAVORS, *Assistant Examiner.*